US012617357B2

(12) United States Patent
Ive et al.

(10) Patent No.: US 12,617,357 B2
(45) Date of Patent: May 5, 2026

(54) LUMINOUS DEVICE FOR TURNING ON A ROAD VEHICLE AND RELATIVE ROAD VEHICLE

(71) Applicant: FERRARI S.P.A., Modena (IT)

(72) Inventors: Jonathan P. Ive, San Francisco, CA (US); Eugene Whang, San Francisco, CA (US); Jeremy Bataillou, San Francisco, CA (US); Anthony Ashcroft, San Francisco, CA (US); Suhang Zhou, San Francisco, CA (US); Benoit Louzaouen, San Francisco, CA (US); Jemima Kiss, San Francisco, CA (US); Christopher Wilson, San Francisco, CA (US); Wan Si Wan, San Francisco, CA (US); Biotz Natera, San Francisco, CA (US); James McGrath, San Francisco, CA (US); Roger Guyett, San Francisco, CA (US); Joseph Luxton, San Francisco, CA (US); Michael Matas, San Francisco, CA (US); Patrick Kessler, San Francisco, CA (US); Maximilian Romani, Modena (IT); Vito Conigliaro, Modena (IT)

(73) Assignee: FERRARI S.P.A., Modena (IT)

( * ) Notice: Subject to any disclaimer, the term of this patent is extended or adjusted under 35 U.S.C. 154(b) by 90 days.

(21) Appl. No.: 18/499,286

(22) Filed: Nov. 1, 2023

(65) Prior Publication Data
US 2024/0149809 A1 May 9, 2024

(30) Foreign Application Priority Data

| Nov. 4, 2022 | (IT) | ........................ 102022000022614 |
| Nov. 4, 2022 | (IT) | ........................ 102022000022620 |
| Nov. 4, 2022 | (IT) | ........................ 102022000022626 |

(51) Int. Cl.
*B60R 25/20* (2013.01)
*B60R 16/023* (2006.01)

(52) U.S. Cl.
CPC ...... *B60R 16/0235* (2013.01); *B60R 25/2063* (2013.01)

(58) Field of Classification Search
CPC .............. B60R 16/0235; B60R 25/206; B60R 25/2063
See application file for complete search history.

(56) References Cited

U.S. PATENT DOCUMENTS 3,953,720 A * 4/1976 Kelch .................... G07B 13/00
377/55
5,399,002 A * 3/1995 Taylor .................... B60T 17/16
188/1.11 R (Continued)

FOREIGN PATENT DOCUMENTS

CN 86202303 U * 1/1987
CN 204472683 U * 7/2015
(Continued)

OTHER PUBLICATIONS

Italian Search Report for Application No. 202200022614; Filing Date, Nov. 4, 2022; Date of Mailing, Mar. 31, 2023; 7 pages.
(Continued)

*Primary Examiner* — Chico A Foxx
(74) *Attorney, Agent, or Firm* — CANTOR COLBURN LLP

(57) ABSTRACT
Road vehicle comprising an ignition system for the powertrain system comprising in turn a luminous device integral with the passenger compartment of the road vehicle and comprising a movable part configured to move between an off configuration and an on configuration; the luminous device comprising a display device configured to at least partially assume a first colour and a second colour; wherein
(Continued)

the display device is configured to switch from the first colour to the second colour when the movable part switches from the off configuration to the on configuration and vice versa when the movable part switches from the on configuration to the off configuration.

11 Claims, 16 Drawing Sheets

(56)                     References Cited

U.S. PATENT DOCUMENTS

| | | | | |
|---|---|---|---|---|
| 5,982,888 | A * | 11/1999 | Luckeneder | G07C 9/00857 |
| | | | | 713/185 |
| 7,053,866 | B1 * | 5/2006 | Mimran | G02B 27/01 |
| | | | | 359/630 |
| 10,870,411 | B1 * | 12/2020 | Schafer | G07C 9/28 |
| 2006/0113841 | A1 * | 6/2006 | Dornbach | B60R 25/04 |
| | | | | 307/10.3 |
| 2007/0056792 | A1 * | 3/2007 | Hildebrand | B60R 25/24 |
| | | | | 307/10.6 |
| 2007/0252681 | A1 * | 11/2007 | Costello | B60Q 3/292 |
| | | | | 340/426.3 |
| 2009/0128308 | A1 | 5/2009 | Chen | |
| 2009/0224895 | A1 * | 9/2009 | Ballard | B60R 25/24 |
| | | | | 340/426.11 |
| 2011/0068895 | A1 * | 3/2011 | Gee | E05B 77/48 |
| | | | | 340/5.67 |
| 2012/0316030 | A1 * | 12/2012 | Choi | B60K 20/08 |
| | | | | 477/99 |
| 2013/0186226 | A1 * | 7/2013 | Tovar | B60T 7/085 |
| | | | | 74/473.36 |
| 2013/0229820 | A1 * | 9/2013 | Jutila | F21S 43/14 |
| | | | | 362/545 |
| 2014/0001834 | A1 | 1/2014 | Rudolph et al. | |
| 2014/0292527 | A1 * | 10/2014 | Sisneros | H05B 47/19 |
| | | | | 340/693.1 |
| 2015/0171659 | A1 * | 6/2015 | Lee | H02J 50/90 |
| | | | | 320/108 |
| 2015/0251660 | A1 * | 9/2015 | Nelson | B60K 28/10 |
| | | | | 340/576 |
| 2017/0018128 | A1 * | 1/2017 | Berezin | G01S 5/0244 |
| 2018/0038481 | A1 * | 2/2018 | Wagner | B60W 10/04 |
| 2018/0079302 | A1 * | 3/2018 | Tsai | B60K 20/08 |
| 2020/0086785 | A1 * | 3/2020 | Lee | G08B 21/22 |
| 2021/0293335 | A1 * | 9/2021 | Price | F16H 63/42 |
| 2023/0264655 | A1 * | 8/2023 | Reber | B60R 25/24 |
| | | | | 320/107 |

FOREIGN PATENT DOCUMENTS

| | | | | | |
|---|---|---|---|---|---|
| CN | 206623831 | U | * | 11/2017 | |
| CN | 106379273 | B | * | 6/2018 | ........... B60R 25/252 |
| DE | 102004024253 | A1 | | 1/2005 | |
| DE | 102006032137 | A1 | | 2/2008 | |
| EP | 1903508 | A2 | | 3/2008 | |
| EP | 2236363 | A2 | * | 10/2010 | ............ H04B 1/082 |
| EP | 3335943 | A1 | | 6/2018 | |
| EP | 3313698 | B1 | | 5/2020 | |
| JP | 2616102 | B2 | * | 6/1997 | |
| JP | 2006177401 | A | | 7/2006 | |
| WO | 2006021198 | A1 | | 3/2006 | |
| WO | WO-2009021508 | A2 | * | 2/2009 | ............ B60R 25/04 |
| WO | WO-2016108155 | A1 | * | 7/2016 | |
| WO | WO-2019240794 | A1 | * | 12/2019 | ............ E05B 81/76 |
| WO | 2021228588 | A1 | | 11/2021 | |

OTHER PUBLICATIONS

Italian Search Report for Application No. 202200022620; Filing Date, Nov. 4, 2022; Date of Mailing, Apr. 20, 2023; 7 pages.
Italian Search Report for Application No. 202200022626; Filing Date, Nov. 4, 2022; Date of Mailing, Apr. 20, 2023; 7 pages.

* cited by examiner

LUMINOUS DEVICE FOR TURNING ON A ROAD VEHICLE AND RELATIVE ROAD VEHICLE

CROSS-REFERENCE TO RELATED APPLICATIONS

This patent application claims priority from Italian patent applications no. 102022000022614 filed on Nov. 4, 2022, no. 102022000022620 filed on Nov. 4, 2022 and no. 102022000022626 filed on Nov. 4, 2022, the entire disclosure of which is incorporated herein by reference.

TECHNICAL FIELD

The present invention relates to a luminous device for turning on a road vehicle and to a relative road vehicle.

In particular, the present invention has an advantageous, but not exclusive, application in a luminous device for turning on a high-performance road vehicle, to which the description that follows will refer explicitly, but without thus losing its general nature.

CONTEXT OF THE INVENTION

As known, over recent years, totally electric vehicle systems have increasingly been gaining a foothold, meaning those with a powertrain system provided exclusively with one or more electric motors, aimed at placing an ever-increasing distance between the automobile market and the fossil fuels on which it is still heavily dependent.

These vehicles, since they do not have an internal combustion engine, no longer need the so-called "key cycle", meaning the entire electromechanical procedure that leads to ignition of the combustion engine, such as by means of a starter motor.

In light of what has been said, in certain cases, totally electric vehicles have been developed that are configured to switch on (i.e., to activate the powertrain system and allow the gear to be engaged) automatically as soon as the presence of the vehicle key inside the passenger compartment is detected.

However, in such electric vehicles, it is basically impossible to switch off the vehicle when the driver is inside it, as it remains active and ready to depart for as long as the key is detected inside the passenger compartment. This leads to an excessive and unnecessary consumption of energy in the case of lengthy periods spent inside the vehicle, with a consequent greater wear of the electronic components responsible for supplying power to the powertrain system.

In contrast, however, vehicles have been developed on which, in order to assist drivers accustomed to the "key cycle", an ignition button of the road vehicle is present which (always after the key has been detected inside the passenger compartment) allows power supply to the powertrain system to be activated manually and therefore the vehicle to start. In these cases, however, in the case of totally electric vehicles, due to their silence, it is not immediately clear to the driver whether the vehicle is switched on and ready to depart, or whether it is necessary to press the button. In any case, on such vehicles, it is nonetheless necessary to press on the brake pedal at the same time, failing which the powertrain system will not switch on.

In general, there is a need to lengthen the autonomy of the electric road vehicle, and, at the same time to inform the driver of the state of ignition of said road vehicle in a simple and immediate manner.

DESCRIPTION OF THE INVENTION

The object of the present invention is to provide a luminous device for turning on a road vehicle and a relative road vehicle that are at least partially free from the problems described here above and, at the same time, are simple and cheap to manufacture.

According to the present invention, a luminous device for turning on a road vehicle and a relative road vehicle are provided according to what is claimed in the independent claims that follow and, preferably, in any one of the claims that are directly or indirectly dependent upon the independent claims.

The claims describe preferred embodiments of the present invention and form an integral part of this description.

BRIEF DESCRIPTION OF THE DRAWINGS

Several embodiments of the invention will be described below for a better understanding of it, by way of non-limiting example and with reference to the attached drawings, wherein.

EMBODIMENTS OF THE INVENTION

Figure 1:
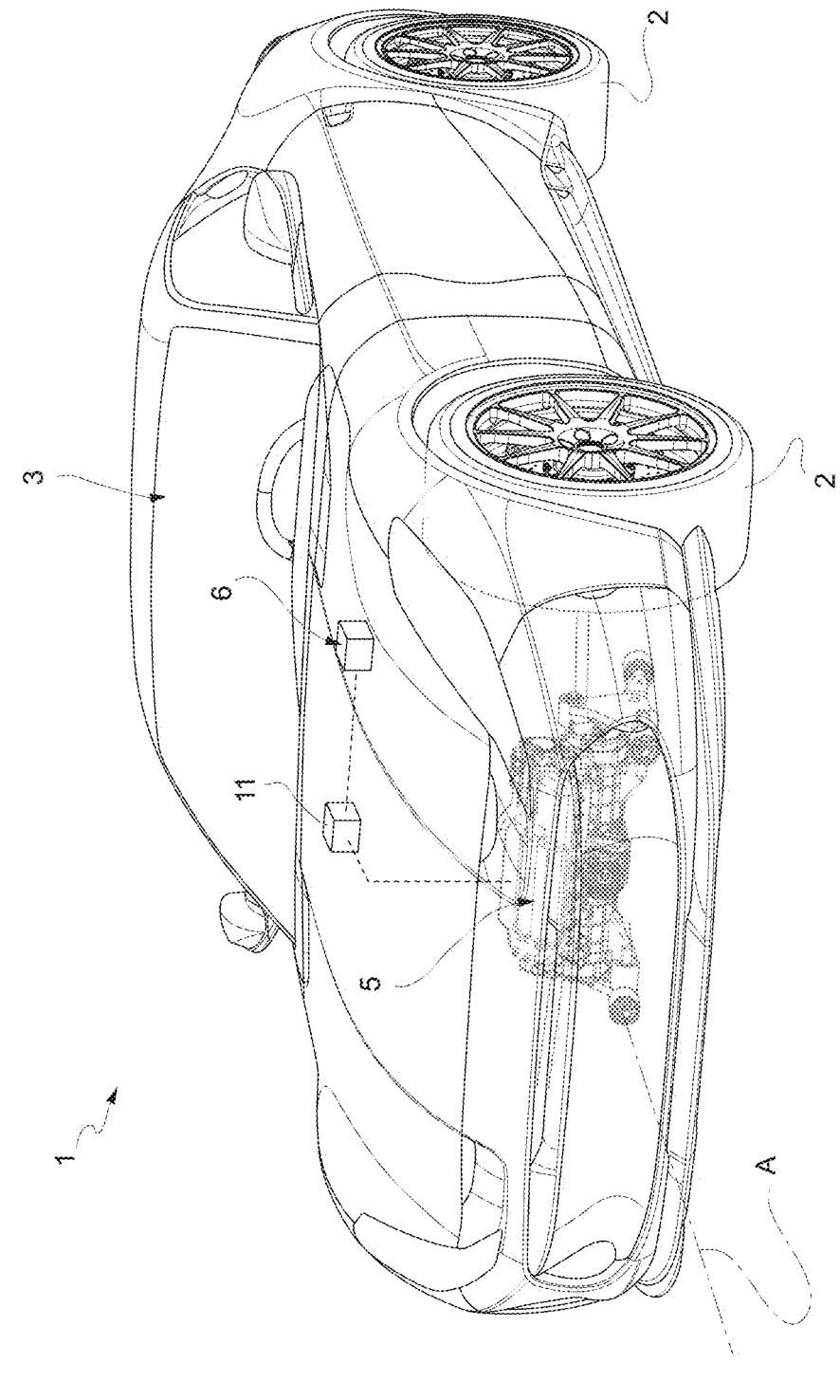
FIG. 1 is a perspective and schematic view, with parts removed for clarity, of a possible embodiment of a road vehicle according to the present invention.

In FIG. 1, number 1 indicates as a whole a road vehicle provided with two front wheels 2 and two rear wheels 2 (in particular drive wheels). The vehicle 1 is provided with a passenger compartment 3 that is apt to accommodate at least a driver and preferably one or more passengers.

The same reference numbers and reference letters in the figures identify the same elements or components with the same function.

In this description, the term "second" component does not imply the presence of a "first" component. Such terms are, in fact, adopted as labels to improve clarity and should not be intended as limiting.

The elements and features illustrated in the different preferred embodiments, including the drawings, may be combined with or isolated from each other without deviating from the scope of protection of this application as described below.

Furthermore, the road vehicle 1 comprises a chassis (of a known type and therefore not illustrated in detail), and a vehicle dashboard 4 inside the passenger compartment and attached to the chassis. The vehicle dashboard is arranged in front of the driver and the passenger, if any.

In detail, and not in a limiting manner, the road vehicle 1 is an entirely electric vehicle, i.e., provided with a rechargeable battery pack (of a known type and therefore not further detailed below).

In particular, the road vehicle 1 comprises a powertrain system 5, which is provided with at least an electric motor and circuitry dedicated to power supply and control of said motor and of the battery pack.

The road vehicle 1 also comprises an ignition system 6 of the powertrain system 5. In other words, the ignition system 6 is configured to perform the known functions of "key-on" and "key-off", i.e., switching on and switching off the powertrain system 5. In particular, the ignition system 6 is configured to enable power supply from the battery pack to the powertrain system 5.

The ignition system 6 preferably comprises a luminous device 7 (integrated into the road vehicle 1 and not removable).

Figure 2:
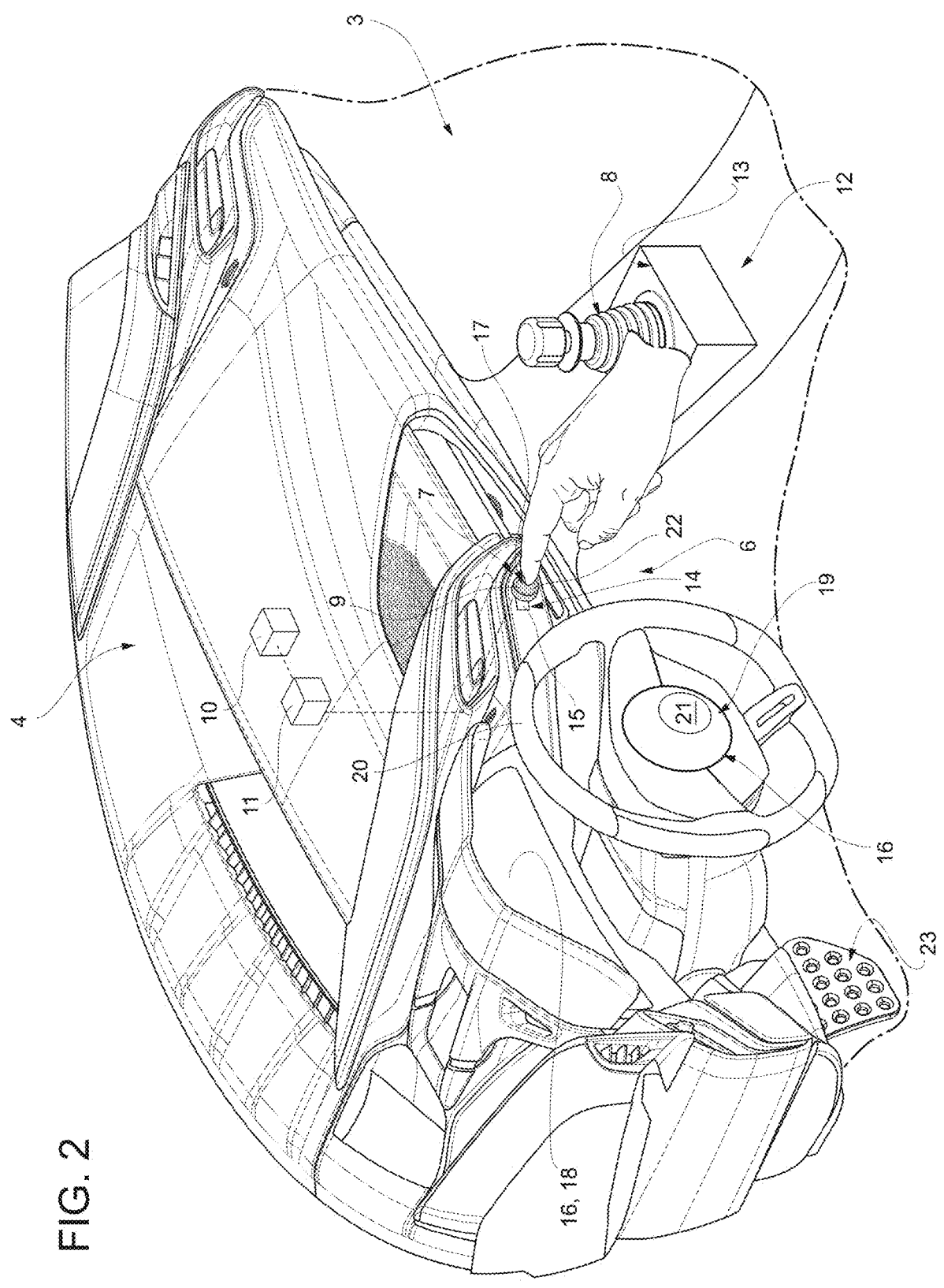
FIG. 2 is a perspective and schematic view of part of the interior of the passenger compartment of a first embodiment of the vehicle of FIG. 1 in a switched-off configuration.
Figure 3:
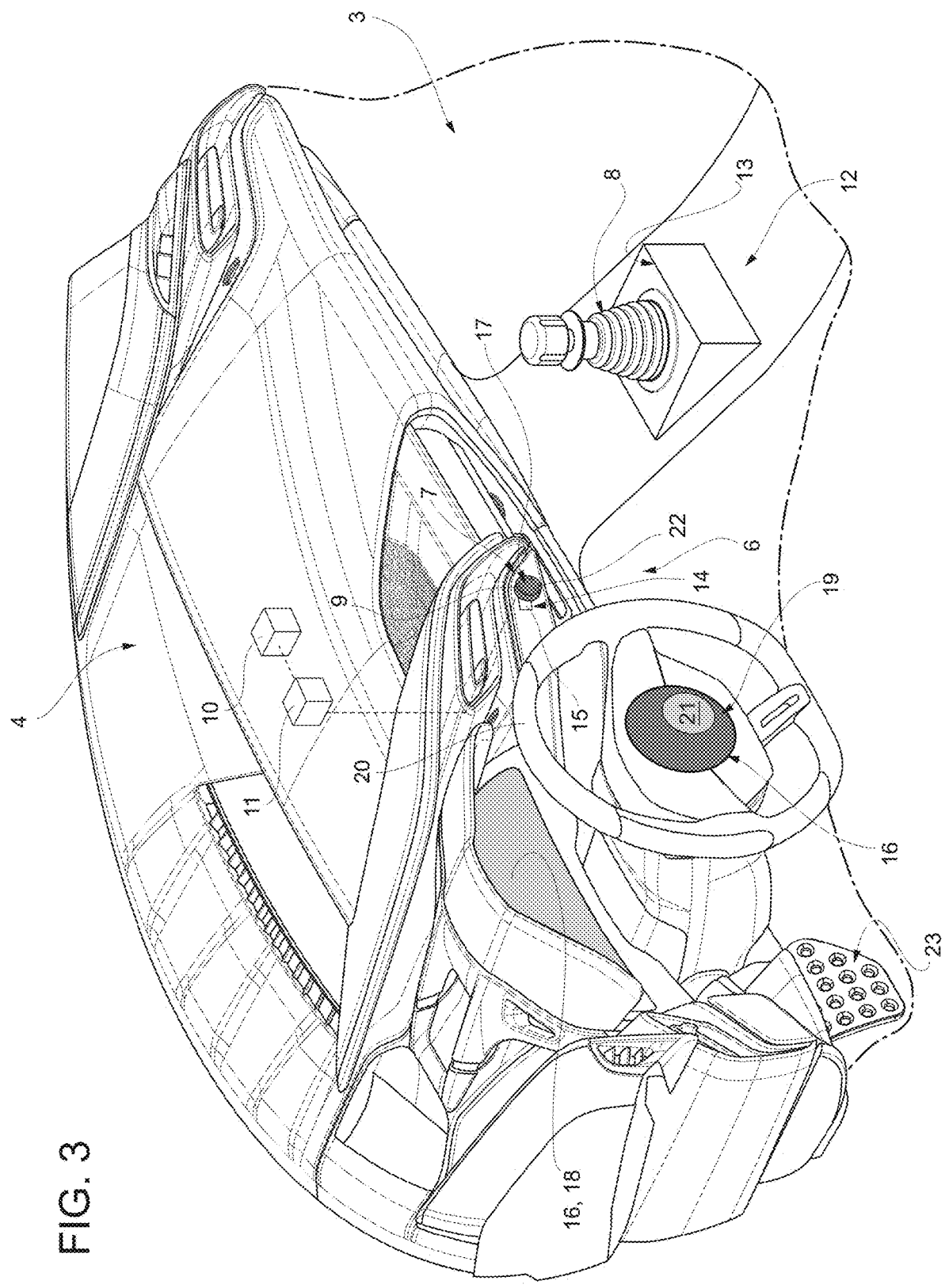
FIG. 3 is a perspective and schematic view of part of the interior of the passenger compartment of the vehicle of FIG. 1 in a first switched-on configuration.

In the non-limiting embodiments of FIGS. 2 and 3, the luminous device 7 is a button.

Figure 2A:
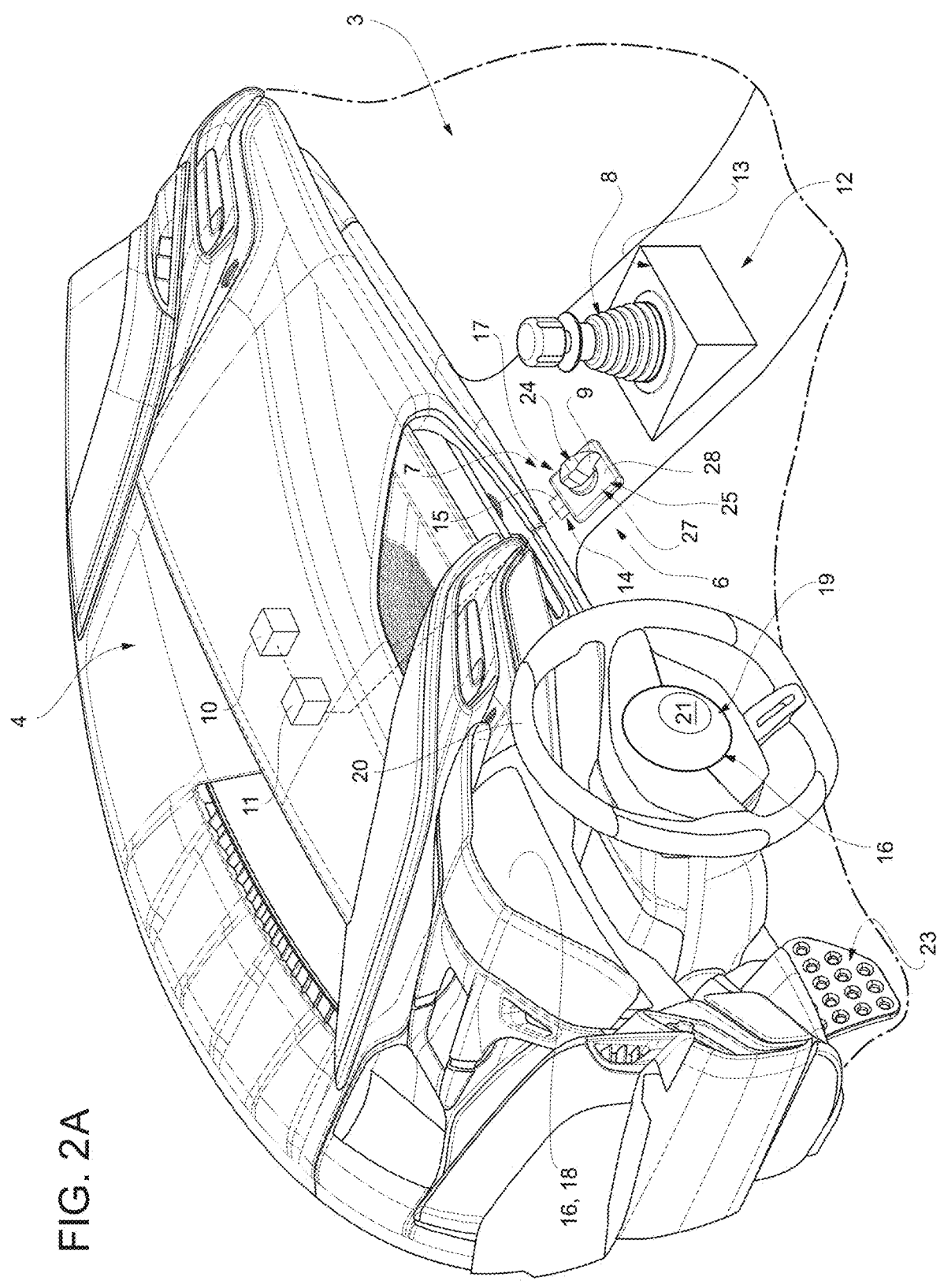
FIG. 2A is a perspective and schematic view of part of the interior of the passenger compartment of a second embodiment of the vehicle of FIG. 1A in a switched-off configuration.
Figure 3A:
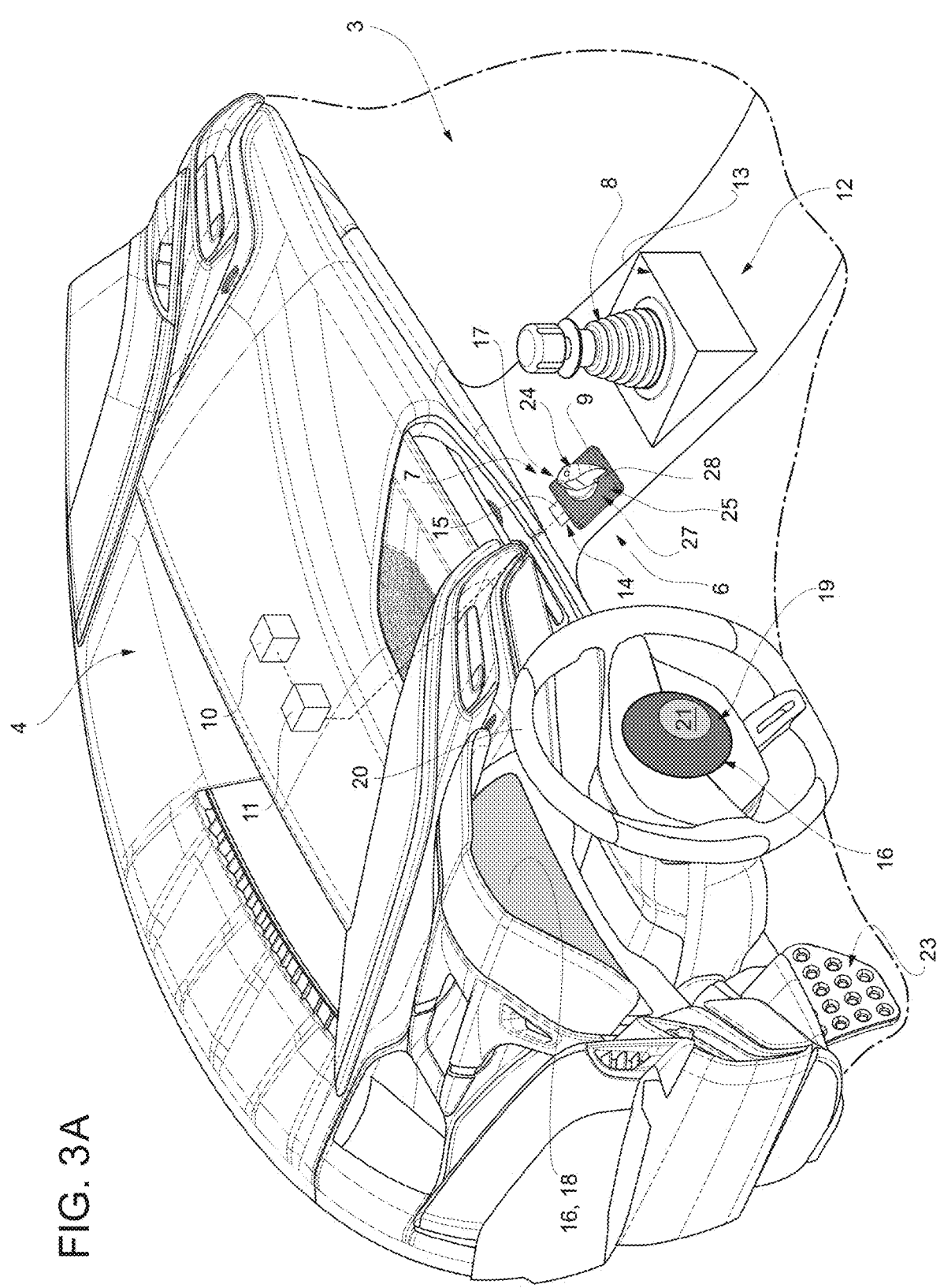
FIG. 3A is a perspective and schematic view of part of the interior of the passenger compartment of the vehicle of FIG. 2A in a first switched-on configuration.

In the non-limiting embodiments of FIGS. 2A and 3A, the luminous device 7 is a lever (for example, a small lever) to be pulled and/or turned to switch from the switched-on configuration to the switched-off configuration.

Figure 2B:
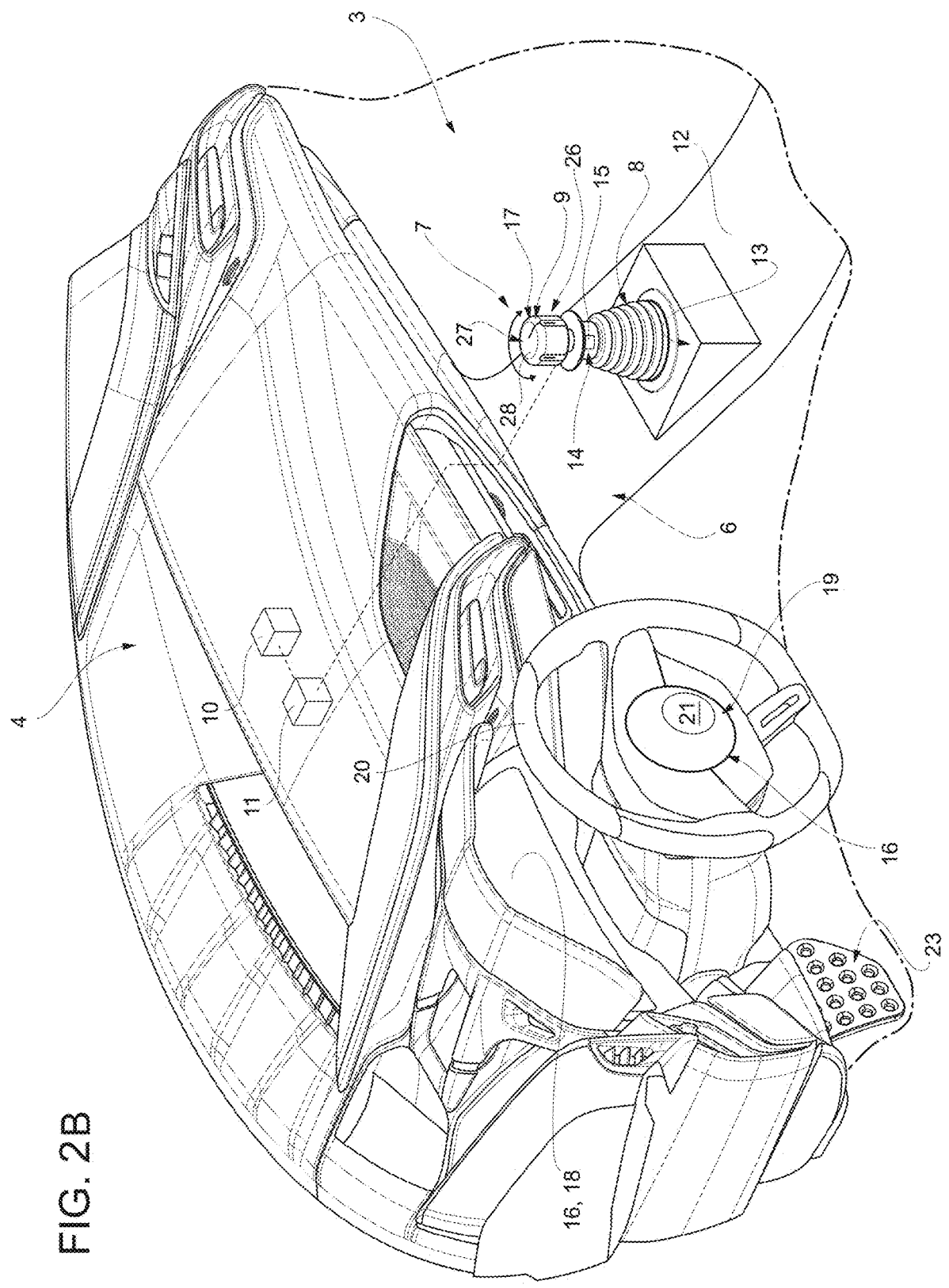
FIG. 2B is a perspective and schematic view of part of the interior of the passenger compartment of a third embodiment of the vehicle of FIG. 1B in a switched-off configuration.
Figure 3B:
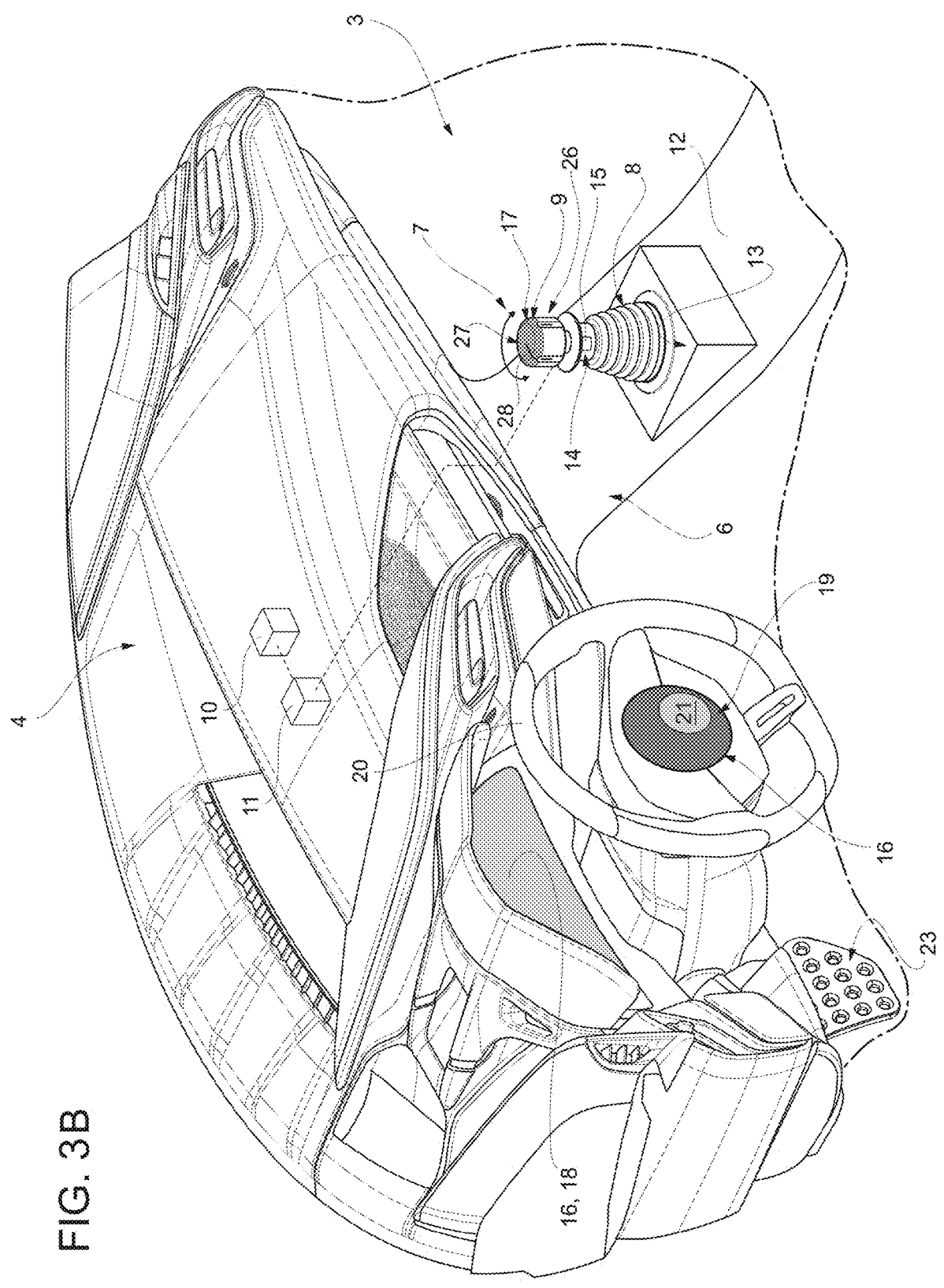
FIG. 3B is a perspective and schematic view of part of the interior of the passenger compartment of the vehicle of FIG. 2B in a first switched-on configuration.

In the non-limiting embodiments of FIGS. 2B and 3B, the luminous device 7 is at least part of a gear lever 8 to be pulled and/or turned to switch from the switched-on configuration to the switched-off configuration.

Advantageously but not in a limiting manner, the ignition system 6 comprises a detection system 10 (preferably wireless, for example RFID, Wi-Fi or Bluetooth®), which is configured to detect the presence or absence of a key (not illustrated, conventional or possibly integrated into a mobile telephone, into a ring, or into a bracelet) at (or in) the passenger compartment 3.

In addition, the ignition system 6, i.e., the road vehicle 1, comprises a control unit 11, which is connected to the detection system 10 and to the powertrain system 5 and is configured to enable power supply from the battery pack to the powertrain system 5 exclusively when the luminous device 7 is operated while the key is detected in the passenger compartment 3. In other words, in contrast with what occurs in the prior art, it is not necessary to press the brake pedal simultaneously and the vehicle is not maintained constantly switched on, pointlessly, when it is not moving.

Physically, the control unit 11 may comprise a single device or several devices separate from each other and communicating by means of the local network (such as Ethernet or CAN) of the road vehicle 1. For example, the control unit 11 may also be delegated to perform further and different activities to ignition.

As illustrated in the non-limiting embodiments of FIGS. 2 to 6, the road vehicle 1 comprises a central tunnel 12 (i.e., the object normally used to contain the cabling and gearbox of the road vehicle 1 and to separate the driver zone from the passenger zone), arranged along a longitudinal symmetry axis A of the passenger compartment 3.

In several non-limiting cases, as in the case of the embodiments of FIGS. 2A to 6B, the luminous device 7 is arranged at the central tunnel 12, in particular facing upwards. In this manner, the driver of the road vehicle 1 can switch on and switch off the powertrain system 5 substantially without raising their elbow from said central tunnel 12.

In other non-limiting embodiments, such as the one illustrated in FIGS. 2 and 3, the luminous device 7 is arranged at the dashboard 4, in particular on a central portion of the dashboard 4 (i.e., to the right of the steering column), in a manner that the luminous device 7 is facing towards the centre of the passenger compartment 3.

In several non-limiting cases, the luminous device 7 is positioned on an upper portion 13 of the central tunnel 12, in a manner that the luminous device 7 is facing towards the vehicle roof 30 of the passenger compartment 3. In particular, therefore, the driver operates the luminous device 7 by pressing it (like a button) in the embodiment of FIGS. 2 and 3 or by rotating a movable part 9 thereof (for example, the gear lever 8 or a small lever, as indicated by the arrows in FIGS. 2A to 6B). In this manner, switching on the vehicle is simplified and, given the light and the colour emitted by the luminous device 7, the state of the vehicle 1 is comprehensible, even when it is standing still.

Advantageously but not in a limiting manner, the slot 8 comprises a locking system 14 of the luminous device 7, which is configured to block the luminous device 7, in particular its movable part 9, in case the speed of the road vehicle 1 is greater than zero and/or a gear is engaged. In other words, in order to be able to move the luminous device 7 from the switched-on configuration to the switched-off configuration, it is necessary for the vehicle to be standing still and in park mode (known as P).

According to several non-limiting preferred embodiments, the locking system 14 comprises a magnetic locking element 15 selectively operable by the control unit 11. In particular, the magnetic locking element 15 is activated and therefore blocks the movable part 9 during movement of the vehicle 1 and/or when the gear or reverse gear are engaged.

According to other non-limiting embodiments (not illustrated), the locking system 14 comprises a mechanical locking element 15, which is operable by the control unit 11 and is configured to block the movable part 9 in the switched-on configuration.

Advantageously but not in a limiting manner, the vehicle 1 comprises a luminous element 16 inside the passenger compartment 3 (in particular, at the dashboard 4), which is configured to assume a first colour (for example, grey or black) when the luminous device 7 is in the switched-off configuration and a second colour (for example, yellow or red) when the luminous device 7 is in the switched-on configuration.

In particular, the first colour and the second colour are different to each other. In this manner, the driver can immediately understand, both from the position of the movable part 9 and (without looking away) from the colour of the luminous element 16.

At the same time and with the same criterion, advantageously but not in a limiting manner, the ignition system 6 (in particular, the control unit 11) is configured to change the colour of at least part 17 of the luminous device 7. In other words, the luminous device 7 therefore comprises being in the switched-on configuration or in the switched-off configuration and changes colour at least in part 17.

Preferably but not in a limiting manner, the colour change controlled by the control unit 11 is from a third colour (for example, yellow or red) to a fourth colour (for example, black or grey), following positioning of the luminous device 7 (in particular the movable part 9) in the switched-on configuration, and vice versa when the luminous device 7 switches to the switched-off configuration.

Advantageously but not in a limiting manner, the third colour is equal to the second colour and the fourth colour is equal to the first colour. In this manner, substantially, in operating the luminous device 7, the driver perceives the change of colour from part 17 of the luminous device 7 of ignition to the rest of the road vehicle 1, in particular the luminous element 16.

In certain, non-limiting cases, the luminous element 16 is part of a control panel 18.

In other cases, preferred but also non-limiting, the luminous element 16 is a part 19 of the steering wheel 20, in particular a surface 21 arranged at a front airbag 22 (driver side).

Figure 4:
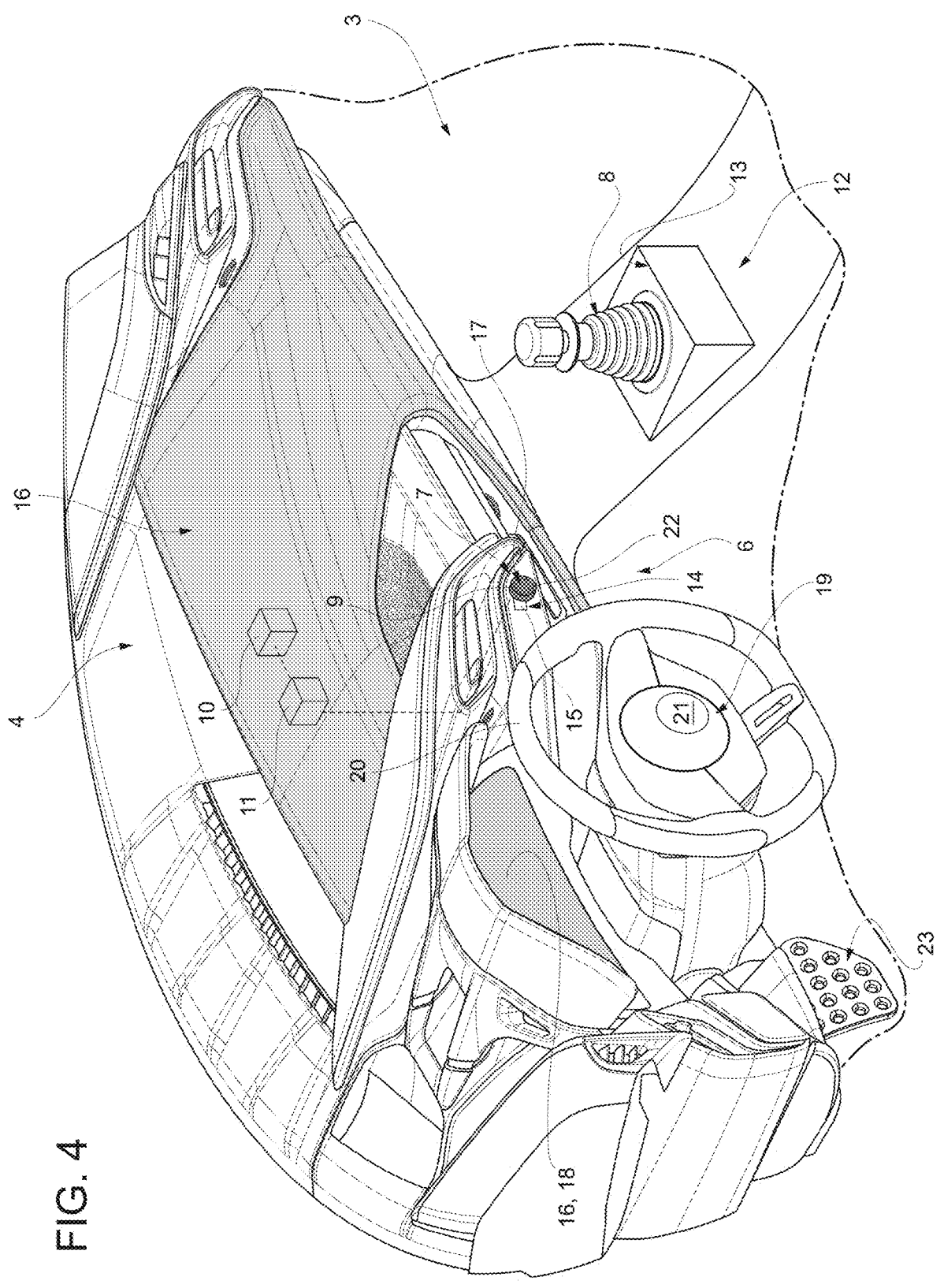
FIG. 4 is a perspective and schematic view of part of the interior of the passenger compartment of the vehicle of FIG. 1 in a second switched-on configuration.
Figure 4A:
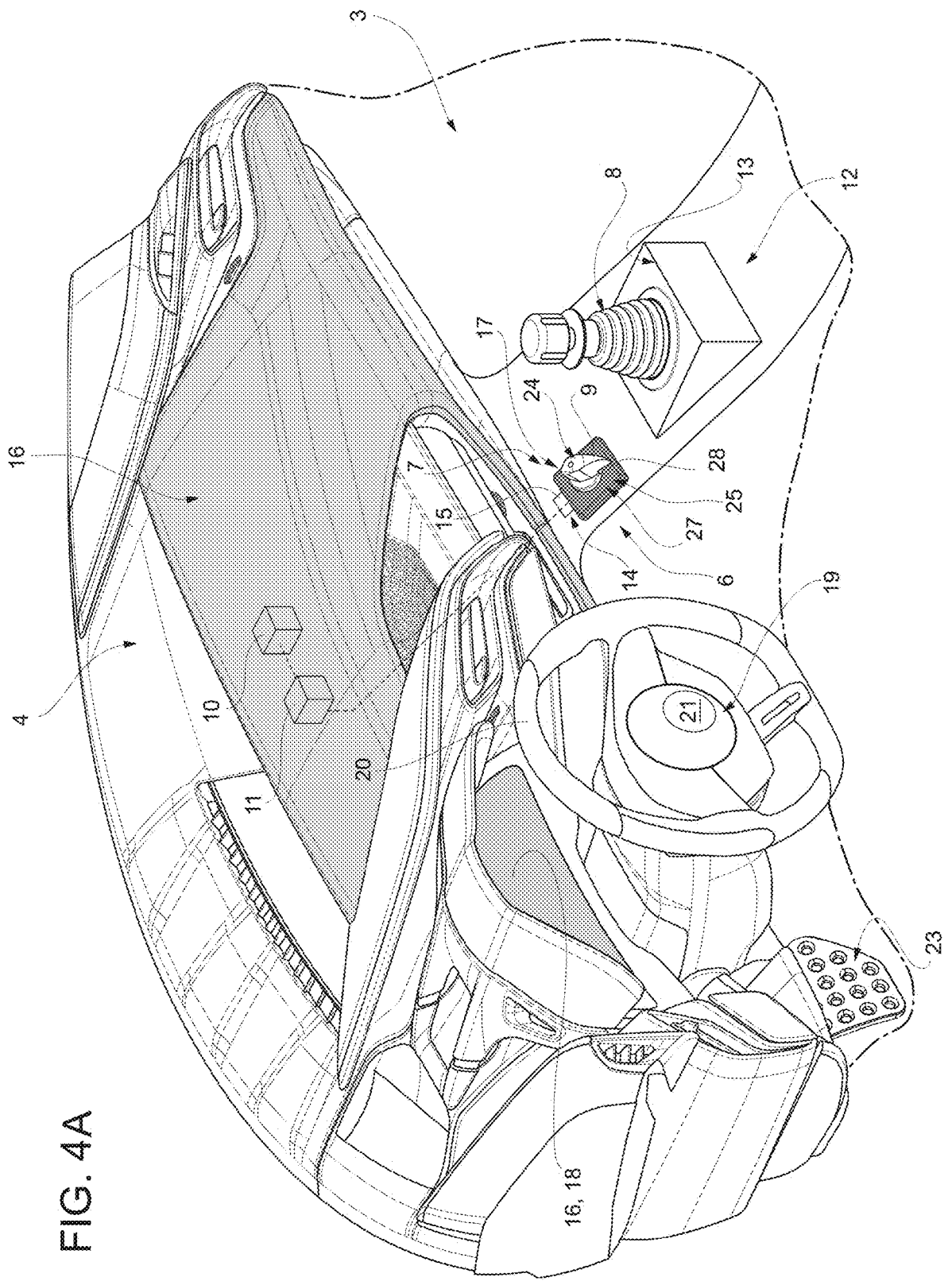
FIG. 4A is a perspective and schematic view of part of the interior of the passenger compartment of the vehicle of FIG. 2A in a second switched-on configuration.
Figure 4B:
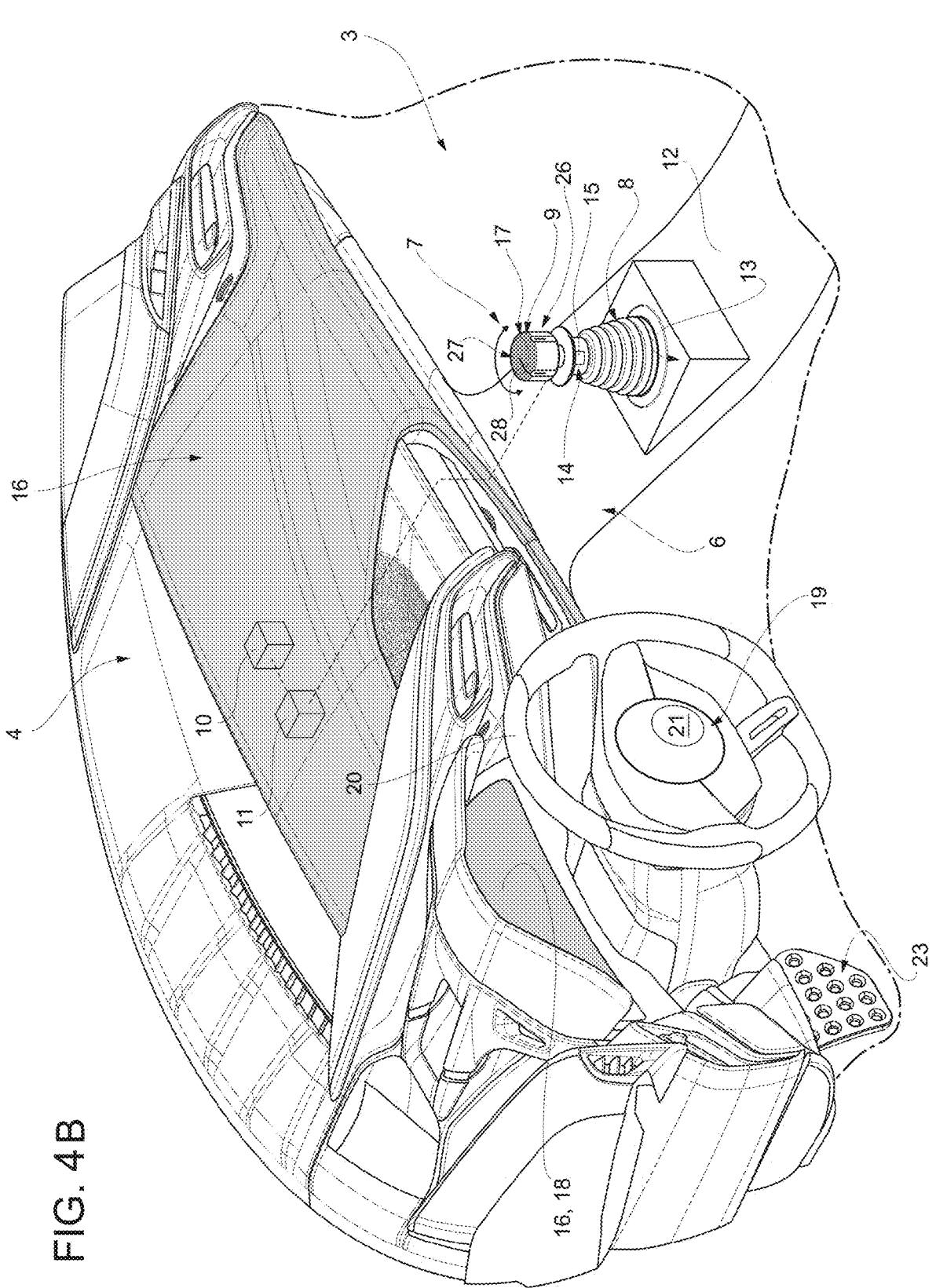
FIG. 4B is a perspective and schematic view of part of the interior of the passenger compartment of the vehicle of FIG. 2B in a second switched-on configuration.

In the non-limiting embodiment of FIG. 4, the luminous element 16 is a part of the dashboard 4, in particular any surface covering of the dashboard 4.

Figure 5:
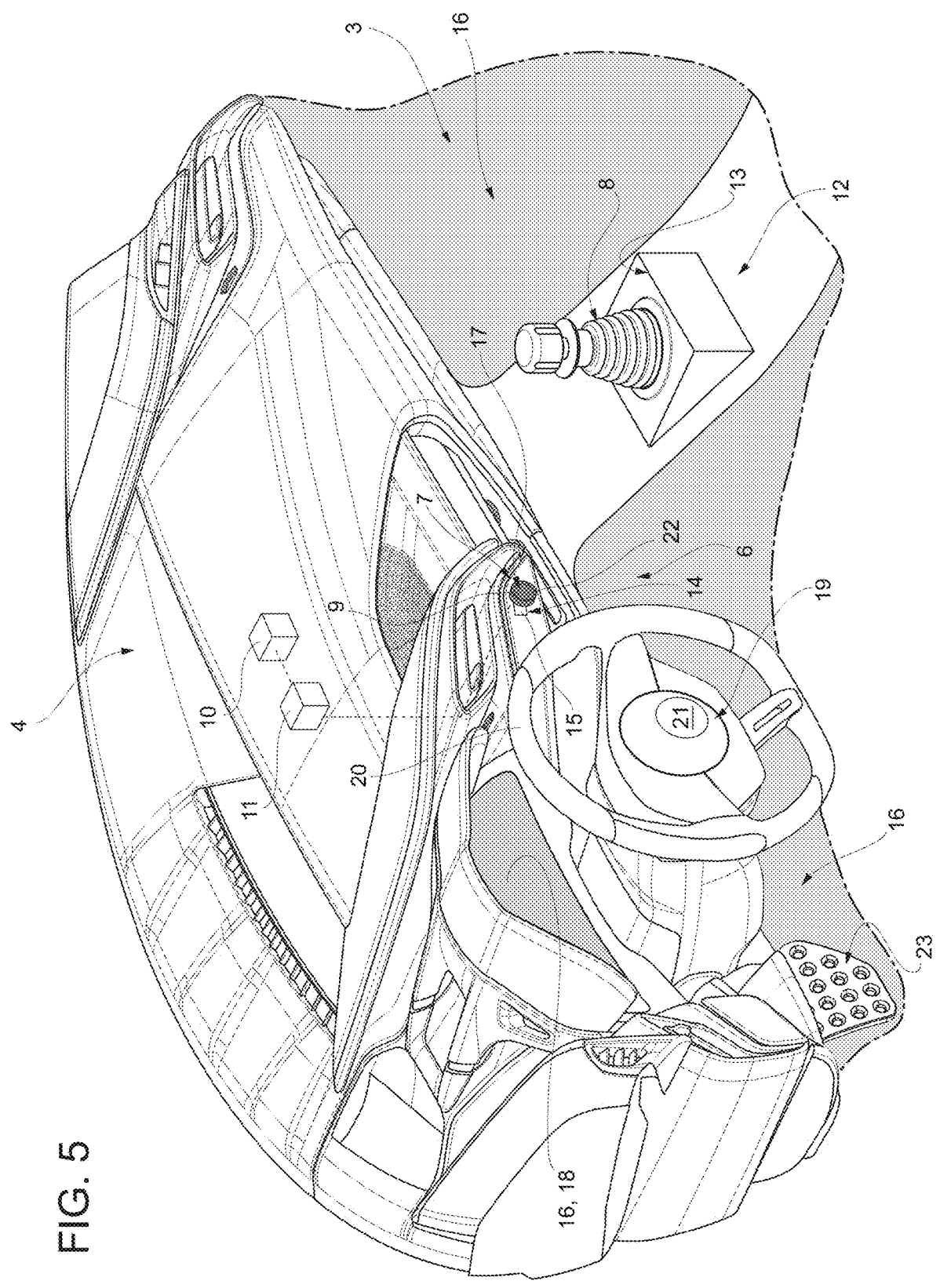
FIG. 5 is a perspective and schematic view of part of the interior of the passenger compartment of the vehicle of FIG. 1 in a third switched-on configuration.
Figure 5A:
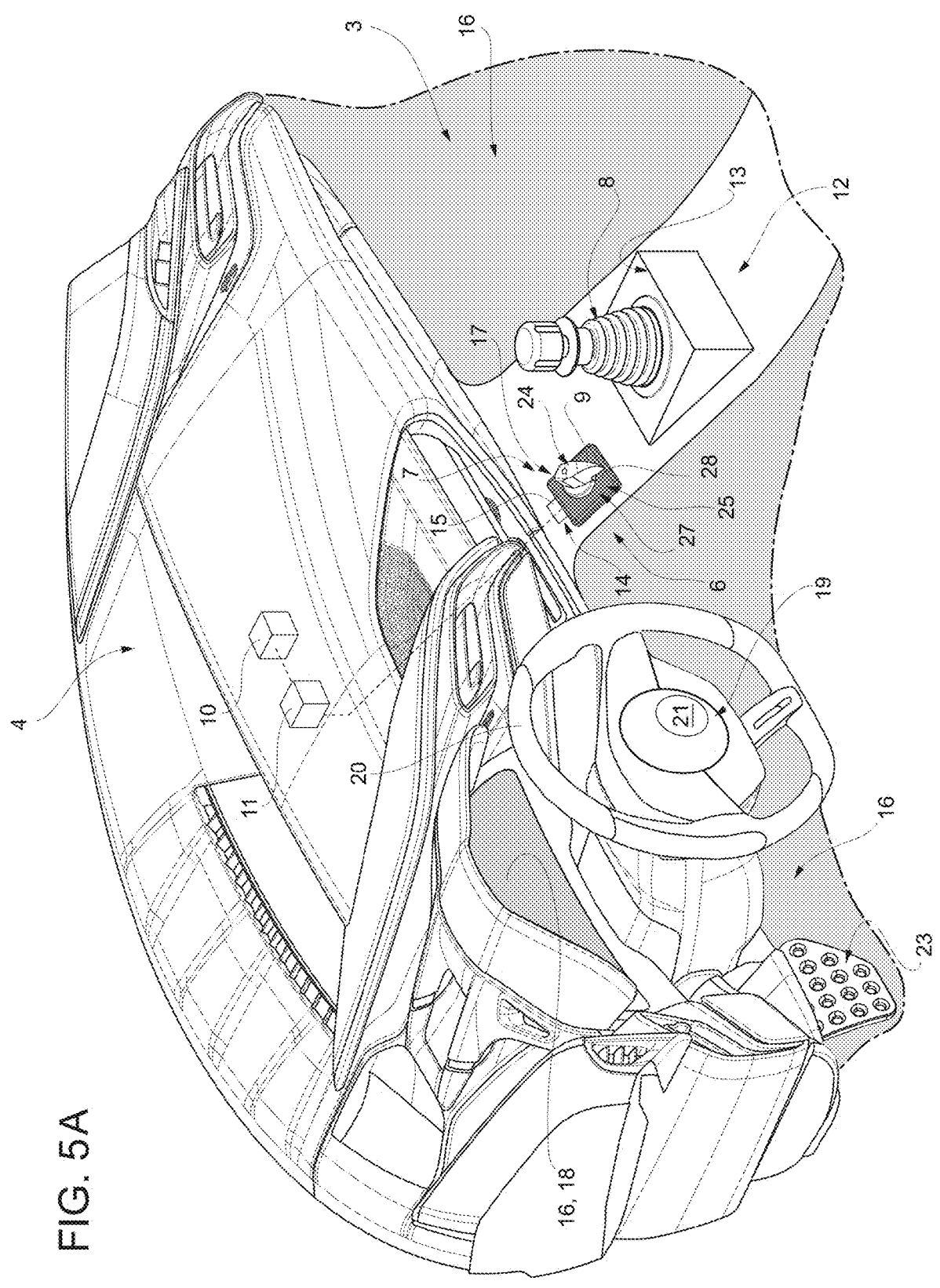
FIG. 5A is a perspective and schematic view of part of the interior of the passenger compartment of the vehicle of FIG. 2A in a third switched-on configuration.
Figure 5B:
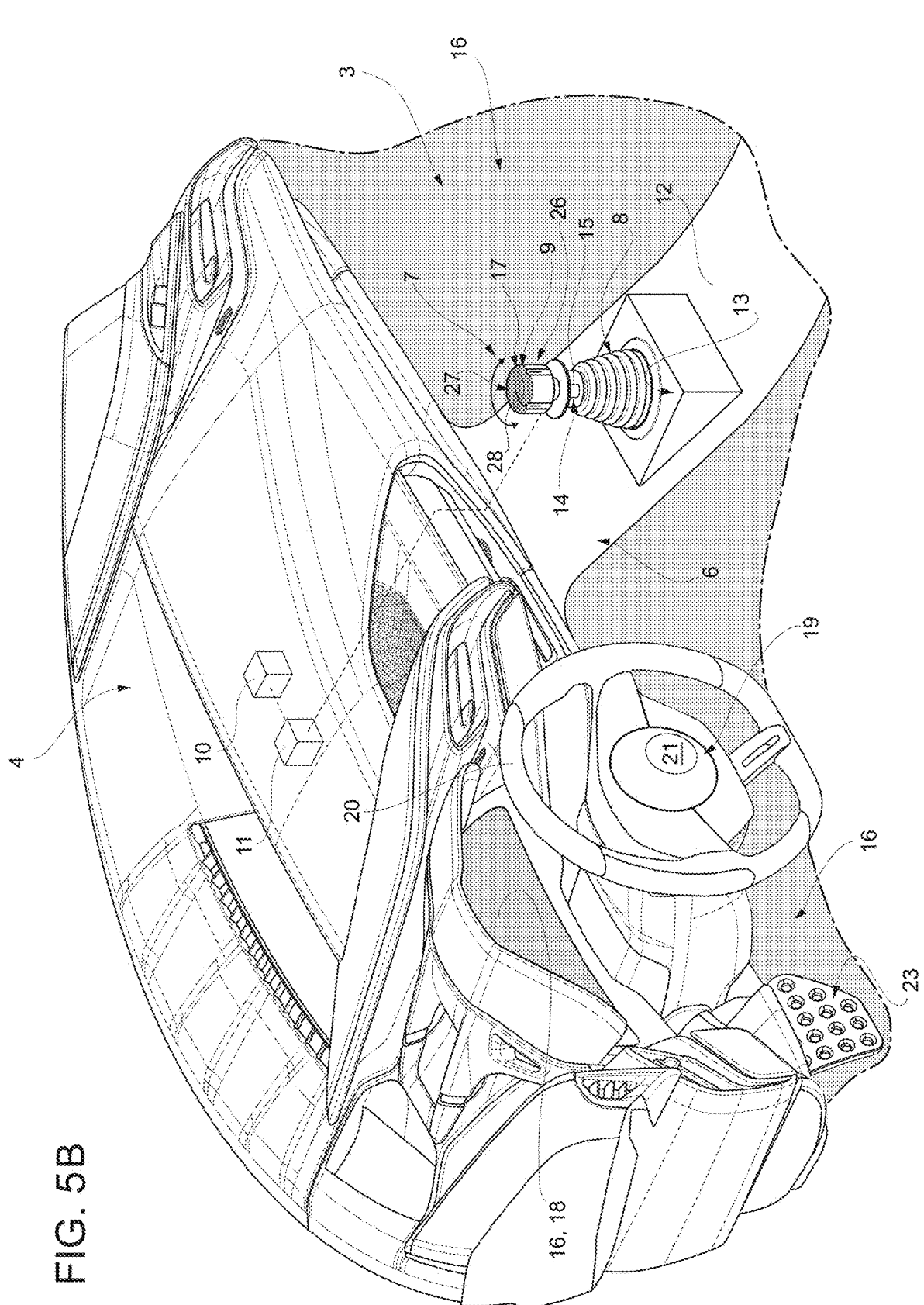
FIG. 5B is a perspective and schematic view of part of the interior of the passenger compartment of the vehicle of FIG. 2B in a third switched-on configuration.

In the non-limiting embodiment of FIG. 5, the luminous element 16 is the so-called "ambient lights", i.e. those devices that light the passenger compartment without disturbing driving (i.e. usually by means of indirect lighting), for example usually in the zone occupied by the legs of the driver or the passenger, or the contours of the buttons on the dashboard 4, or their backlights, or even luminous strips arranged on the slits of the coverings to light the passenger compartment in an indirect manner.

Figure 6:
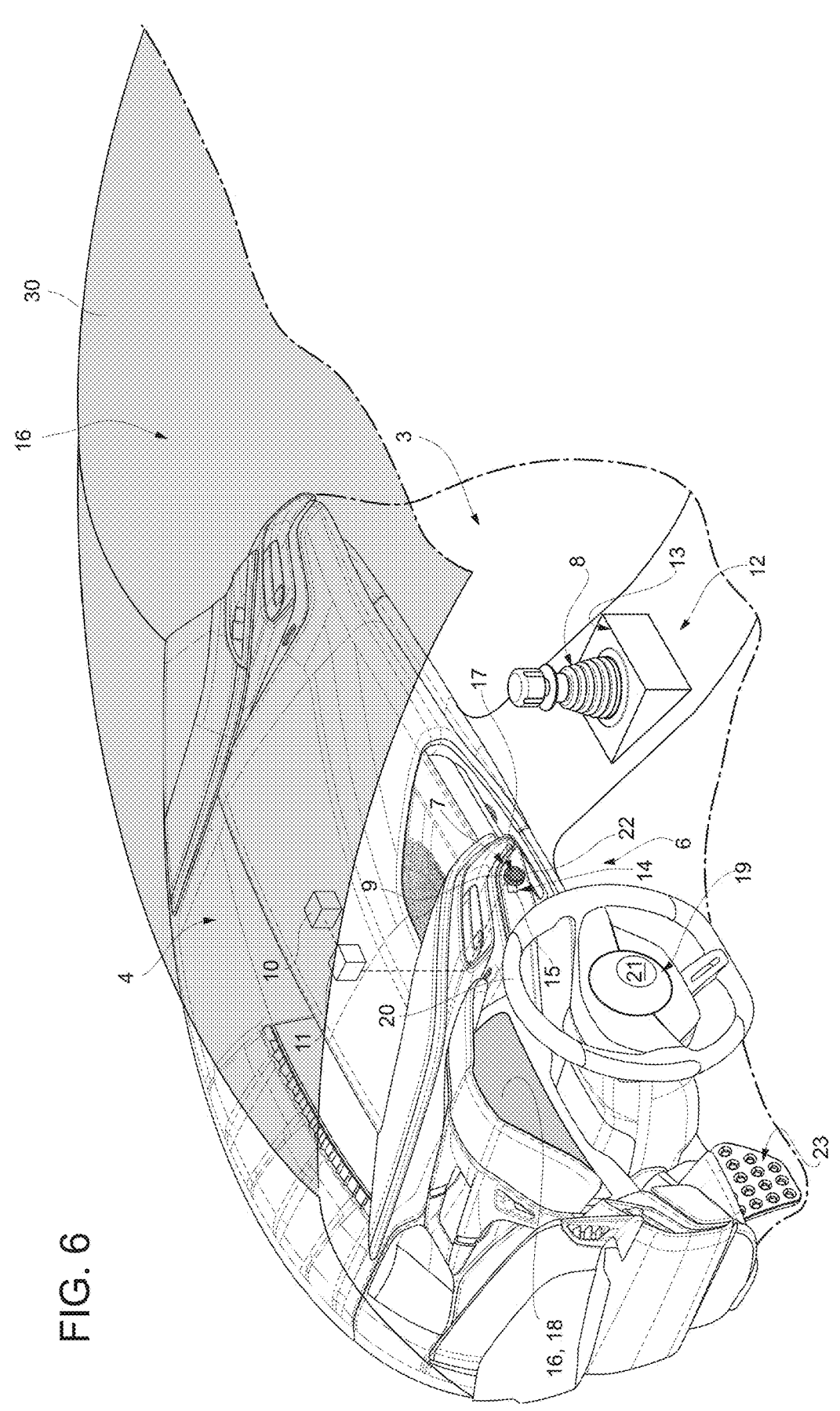
FIG. 6 is a perspective and schematic view of part of the interior of the passenger compartment of the vehicle of FIG. 1 in a fourth switched-on configuration.
Figure 6A:
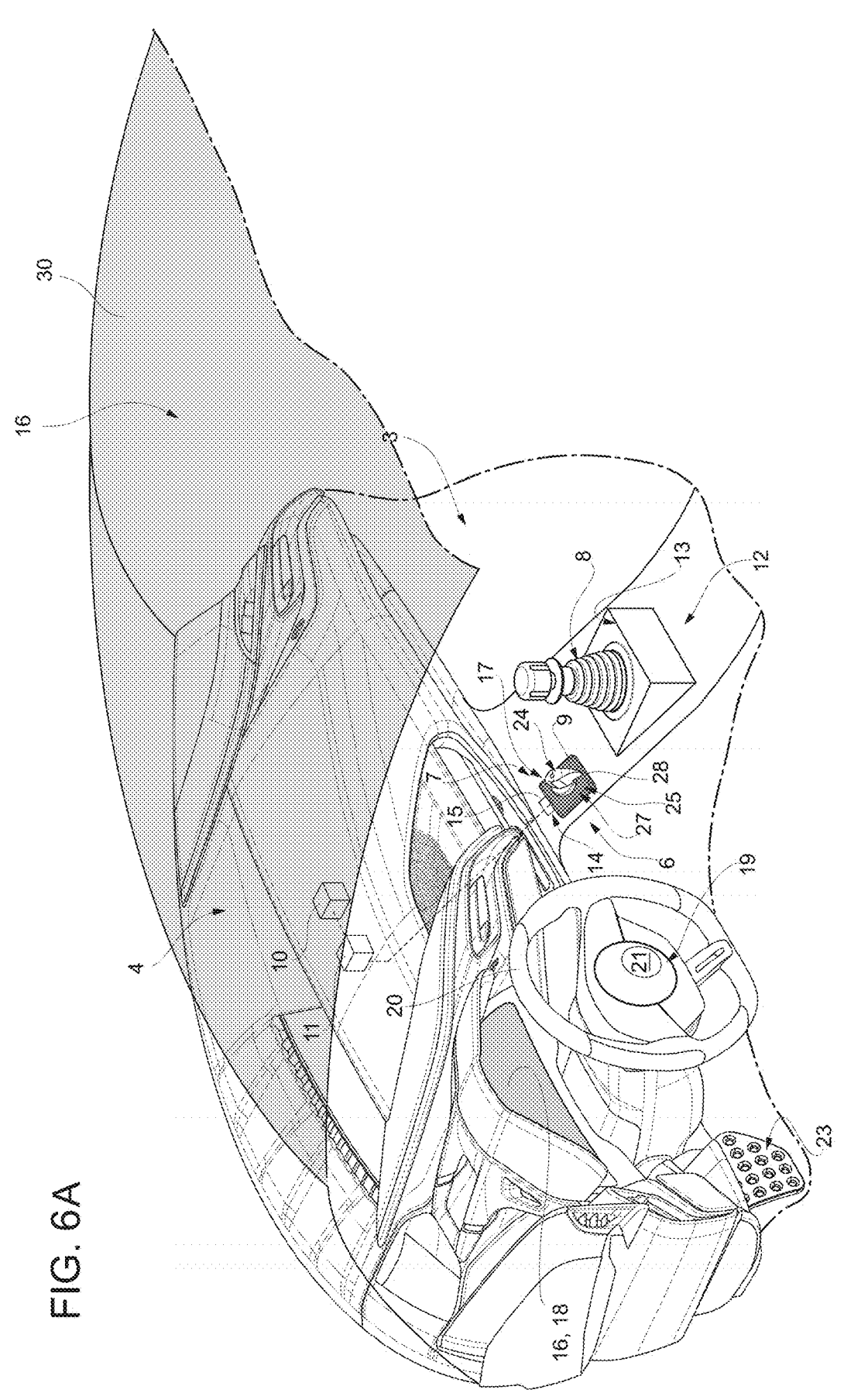
FIG. 6A is a perspective and schematic view of part of the interior of the passenger compartment of the vehicle of FIG. 2A in a fourth switched-on configuration.
Figure 6B:
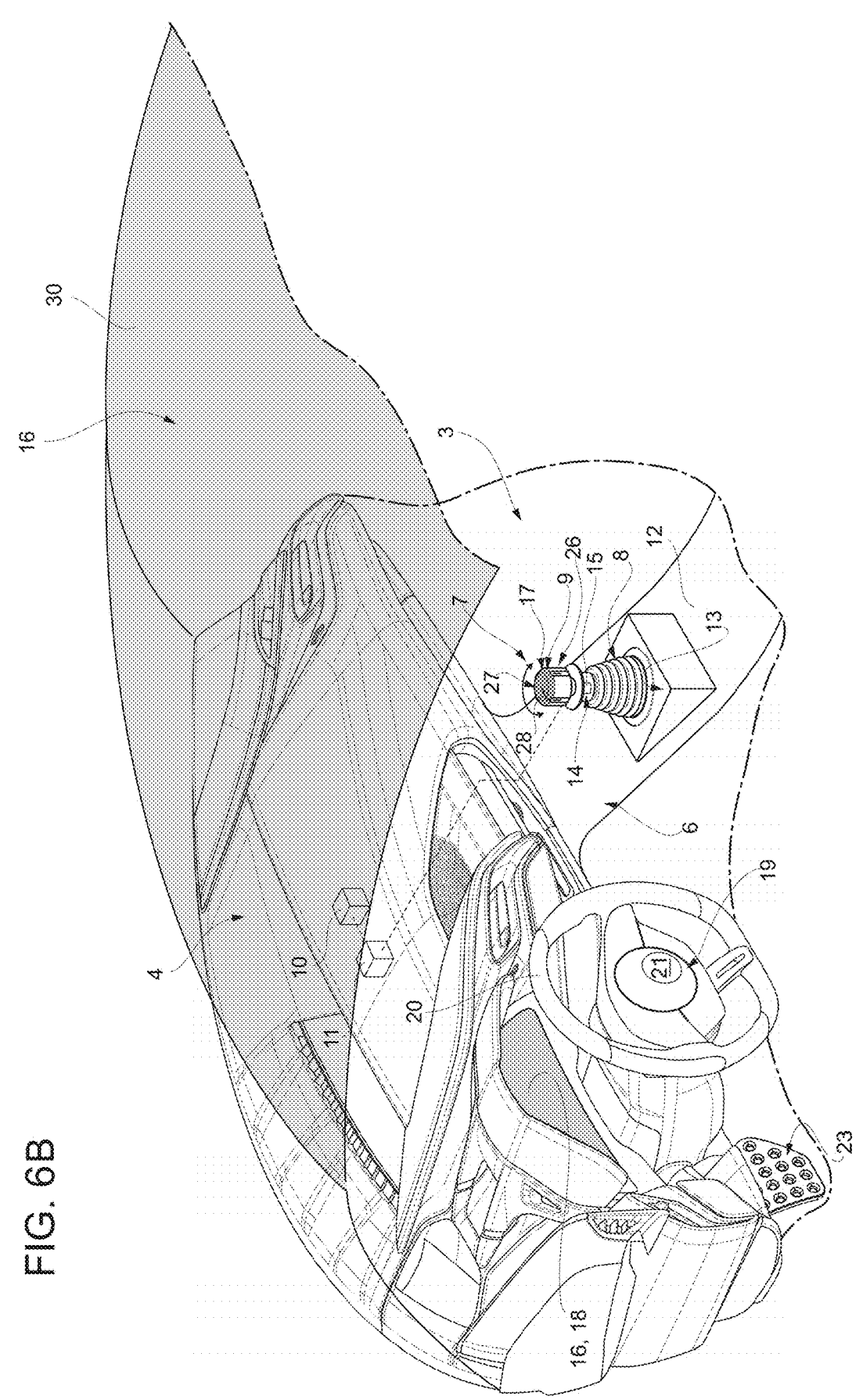
FIG. 6B is a perspective and schematic view of part of the interior of the passenger compartment of the vehicle of FIG. 2B in a fourth switched-on configuration.

In the non-limiting embodiment of FIG. 6, the luminous element 16 is a part of a vehicle roof 30, in particular any surface covering of the vehicle roof 30 inside the passenger compartment 3.

In further non-limiting cases, the third colour is equal to the first colour and the second colour is equal to the fourth colour. In this manner, in operating the luminous device 7, the driver perceives complete ignition of the road vehicle 1, starting from the object being touched up to the control panel 18.

As previously mentioned, preferably, the ignition system 6 does not comprise means for sensing the pressure of a pedal, in particular of a brake pedal 23. In this manner, ignition, i.e., enabling power supply to the powertrain system 5, is entirely dependent upon the configuration of the luminous device 7 (and upon the presence of the key in the passenger compartment 3), making the system simple, but comprehensible and reliable at the same time.

According to several non-limiting embodiments, such as those illustrated in FIGS. 2 and 3, the luminous device 7 comprises (is) a button 22, preferably at least partially transparent, which is configured to switch (entirely) from the third colour to the fourth colour in switching from a switched-off configuration to a switched-on configuration, for example from a distal configuration (FIG. 2) to a pressed configuration (FIG. 3).

According to other non-limiting embodiments, such as those illustrated in FIGS. 2A and 3A or 2B and 3B, the luminous device 7 comprises a lever 24 on which the movable part 9 is rotatable around a perpendicular axis to the surface on which the lever is installed. In other non-limiting embodiments, the lever 24 rotates around an axis parallel to the surface on which the lever 24 is installed.

In particular, in the embodiments of FIGS. 2B-6B, the lever 24 comprises a basic body 25, which surrounds the lever 24 and is configured to switch from the third to the fourth colour as a function of the position of the lever 24. As an alternative, it can be lever 24 itself that changes colour from the third to the fourth as a function of its position.

According to the non-limiting embodiment of FIGS. 2 and 3, 2A and 3A, 2B and 3B, it is the movable part 9 itself that changes colour, switching from the third to the fourth colour as a function of its position.

In particular, in the embodiments of FIGS. 2B-6B, the movable part 9 is disposed at the top 26 of the gear lever 8.

Preferably but in a non-limiting manner, the top 26 of the gear lever 8, or the movable part 9, is configured to rotate around a substantially vertical axis of rotation or, in any case, corresponding to or parallel with the longitudinal axis of said gear lever 8.

In accordance with what has been said so far, therefore, the luminous device 7 also comprises a display device 27, which is configured to assume at least partially the third colour and the fourth colour according to what has been described previously.

In accordance with what has been said so far, advantageously but not in a limiting manner, the display device 27 is configured to switch from the third colour to the fourth colour when the movable part 9 is positioned in the switched-on configuration and vice versa when the movable part 9 is positioned in the switched-off configuration.

In detail, the display device 27 corresponds with the part 17 of the luminous device 7 described above.

According to several preferred embodiments, the display device 27 comprises an electronic ink screen 28. In this manner, it is possible to reduce to a minimum the energy consumption to switch from the third colour to the fourth colour and vice versa.

According to other embodiments not illustrated, the display device 27 comprises a liquid crystal display 28 (for example, LCD or OLED). In this manner, it is possible to increase the luminosity and the flexibility in display of the contents on the screen 28, for example by adding animations.

In use, the driver enters into the passenger compartment with the key on their person, while the luminous device 7 is in the switched-off configuration having the coloured surface (of the third colour, which may also be black or transparent), for example yellow. The vehicle 1 is switched on, i.e., the control unit 11 enables power supply to the powertrain system 5, by operating, i.e., pressing or rotating, the movable part 9 of the luminous device 7.

As soon as the detection system 10 detects the key and the movable part 9 is in the switched-on position, the latter is blocked by the locking system 14, changes colour, for example becomes black, and the surface 21 of the steering wheel 20 switches from black to yellow, indicating to the driver that the vehicle is effectively switched on and that it is possible to engage a gear and operate the powertrain system 5. In the same manner, in order to switch off the road vehicle 1, for example when it is in park mode, it is possible to move the movable part 9 of the luminous device 7 into the switched-off position once again. As soon as the portion 9 returns to the switched-off configuration, the luminous device 7 once again assumes, for example thanks to the screen 28 or to one or more LEDs, the colour yellow for example, and the surface 21 of the steering wheel 20 turns black again.

Obviously, the colours indicated are simply examples and can be replaced with other colours. In certain cases, said colours may also be set by the driver, based on their own preferences.

Although the invention described here above makes particular reference to an example of a precise embodiment, it is not to be considered as limited to said example of an embodiment, as its scope includes all those variants, changes or simplifications covered by the attached claims, such as, for example, a different type of road vehicle (such as front-wheel drive), a different shape of the passenger compartment, different locking systems, a different type of screen, etc.

The vehicle and the luminous device described above offer numerous advantages.

In the first place, they allow a simple and immediate indicator of the state of ignition of the vehicle to be provided to the driver.

Furthermore, they allow saving of the charge of the vehicle battery pack when the vehicle is not moving, as it is possible to switch off the vehicle 1.

A further advantage of the present invention resides in the fact that, thanks to the electronic ink screen, visibility of the colour and its opacity is maximised.

In addition, the locking system avoids sudden and involuntary switching off of the road vehicle, thus maintaining appropriate safety.

LIST OF REFERENCE NUMBERS OF THE FIGURES 1 vehicle
2 wheels
3 passenger compartment
4 dashboard
5 powertrain system
6 ignition system
7 luminous device
8 gear lever
9 movable part
10 detection system
11 control unit
12 central tunnel
13 upper portion
14 locking system
15 magnetic locking element
16 luminous element
17 part of the luminous device 7
18 control panel
19 part of the steering wheel
20 steering wheel 21 surface
22 button
23 brake pedal
24 lever
25 basic body
26 top of the gear lever
30 vehicle roof
A central axis of symmetry

The invention claimed is:

1. Road vehicle (1) comprising:
   four wheels (2), of which at least one pair of wheels (2) is driven;
   a passenger compartment (3);
   a powertrain system (5);
   an ignition system (6) of the powertrain system (5) comprising a luminous device (7) integral with the passenger compartment (3) of the road vehicle (1) and comprising a movable part (9) configured to move between an off configuration and an on configuration for the ignition of the road vehicle (1) and vice versa for the switching off of the road vehicle (1);
   the ignition system (6) comprising a detection system (10), configured to detect the presence or absence of a key inside the passenger compartment (3), and a control unit (11), which is connected to the detection system (10) and to the powertrain system (5) and is configured to enable power supply to the powertrain system (5) exclusively when the movable part (9) is in the switched-on configuration;
   the luminous device (7) comprising a display device (27) configured to at least partially assume a first colour and a second colour;
   wherein the display device (27) is configured to switch from the first colour to the second colour when the movable part (9) switches from the off configuration to the on configuration and vice versa when the movable part (9) switches from the on configuration to the off configuration; and
   wherein the ignition system (6) does not comprise means for sensing the pressure of a pedal, in particular of a brake pedal (23), further characterized in that second color visually indicates that the ignition system (6) is available to energize the power supply to the powertrain system (5) to switch the road vehicle (1) on without the brake pedal (23) being depressed when the key presence is detected in the passenger compartment (3) of the road vehicle (1).

2. Road vehicle (1) according to claim 1, wherein the display device (27) comprises a screen (28).

3. Road vehicle (1) according to claim 1, wherein the luminous device (7) comprises, in particular is, a button (1); and/or wherein the luminous device (7) comprises, in particular is, a lever (24) pullable and/or rotatable around a respective axis of rotation; and/or wherein the luminous device (7) comprises, in particular is, a gear lever (8) rotatable around a respective axis of rotation.

4. Vehicle (1) according to claim 1 and comprising a central tunnel (12), arranged along an axis (A) of longitudinal symmetry of the passenger compartment (3); wherein the luminous device (7) is arranged at the central tunnel (12), in particular with the movable part (9) facing upwards.

5. Road vehicle (1) according to claim 1, wherein the luminous device (7) comprises a locking system (14), which is configured to block the movement of the movable part (9) in case the speed of the road vehicle (1) is greater than zero and/or a gear is engaged.

6. Road vehicle (1) according to claim 5, wherein the locking system (14) comprises a magnetic locking element (15) selectively operable by the control unit (11).

7. Road vehicle (1) according to claim 1, and comprising a luminous element (16) inside the passenger compartment (3), which is configured to assume a third colour when the movable part (9) is in the on configuration and a fourth colour when the movable part (9) is in the off configuration, the third colour and the fourth colour being different from each other.

8. Road vehicle (1) according to claim 7, wherein the ignition system (6) is configured to emit a signal resulting in a colour change of at least part (17) of the luminous device (7).

9. Road vehicle (1) according to claim 7, wherein the third colour is equal to the second colour and the fourth colour is equal to the first colour.

10. Road vehicle (1) according to claim 7, wherein the third colour is equal to the first colour and the fourth colour is equal to the second colour.

11. Road vehicle (1) according to claim 7, wherein the luminous element (16) inside the passenger compartment (3) is a part (19) of the steering (20) wheel, in particular a surface arranged at a front airbag; and/or a part of the dashboard (4) and/or a part of a vehicular roof (30); and/or indirect passenger compartment lighting devices (3).

\*   \*   \*   \*   \*